US009912005B2

(12) United States Patent
Han et al.

(10) Patent No.: US 9,912,005 B2
(45) Date of Patent: Mar. 6, 2018

(54) METHOD OF MANUFACTURING CURVED SECONDARY BATTERY (71) Applicant: SAMSUNG SDI CO., LTD., Yongin-si, Gyeonggi-do (KR)

(72) Inventors: Jun-Hee Han, Suwon-si (KR); In-Seop Byun, Suwon-si (KR); Kwang-Hoon Choi, Suwon-si (KR); Yong-Kyun Park, Suwon-si (KR); Seung-Ho Na, Suwon-si (KR); Jin-Ju Jeong, Suwon-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 13 days.

(21) Appl. No.: 14/493,944

(22) Filed: Sep. 23, 2014

(65) Prior Publication Data
US 2015/0113796 A1 Apr. 30, 2015

(30) Foreign Application Priority Data

Oct. 29, 2013 (KR) .................. 10-2013-0129565
Jul. 7, 2014 (KR) .................. 10-2014-0084627

(51) Int. Cl.
*H01M 10/04* (2006.01)
*H01M 10/44* (2006.01)
(Continued)

(52) U.S. Cl.
CPC .... *H01M 10/0436* (2013.01); *H01M 10/0525* (2013.01); *H01M 10/0585* (2013.01); *H01M 10/44* (2013.01); *Y10T 29/49108* (2015.01)

(58) Field of Classification Search
CPC .................. H01M 10/0436; H01M 10/44
(Continued)

(56) References Cited

U.S. PATENT DOCUMENTS

2007/0059595 A1   3/2007   Endo et al.
2011/0097615 A1   4/2011   Goh et al.
(Continued)

FOREIGN PATENT DOCUMENTS

JP   11-307130 A    11/1999
JP   2002-328353 A  11/2002
(Continued)

*Primary Examiner* — Miriam Stagg
*Assistant Examiner* — Victoria Lynch
(74) *Attorney, Agent, or Firm* — Lee & Morse, P.C.

(57) ABSTRACT

A method of manufacturing a curved secondary battery, the method including preparing a flat secondary battery such that the flat secondary battery includes an electrode assembly and a pouch accommodating the electrode assembly; primary shaping the secondary battery such that the primary shaping includes disposing the flat secondary battery in a first jig, and pressing the flat secondary battery to form a primarily-shaped secondary battery such that the primarily-shaped secondary battery has a first curvature radius; secondary shaping the secondary battery such that the secondary shaping includes disposing the primarily-shaped secondary battery in a second jig, and pressing the primarily-shaped secondary battery to form a secondarily-shaped secondary battery having a second curvature radius; and maintaining the secondarily-shaped secondary battery after forming thereof in the second jig for a predetermined time period.

15 Claims, 4 Drawing Sheets (51) Int. Cl.
*H01M 10/0525* (2010.01)
*H01M 10/0585* (2010.01)

(58) Field of Classification Search
USPC .......................................................... 29/623.1
See application file for complete search history.

(56) References Cited

U.S. PATENT DOCUMENTS

2012/0183825 A1    7/2012  Lee et al.
2013/0108907 A1*   5/2013  Bhardwaj ......... H01M 10/0431
                                                    429/94

FOREIGN PATENT DOCUMENTS

| KR | 2011-0073405 A | 6/2011 | | |
|----|----|----|----|----|
| KR | 2012-0024108 A | 3/2012 | | |
| KR | 2012-0082808 A | 7/2012 | | |
| WO | WO 0182393 A2 | * | 11/2001 | .......... H01M 2/0207 |
| WO | WO2014049070 | * | 3/2014 | ............. B21D 22/22 |

* cited by examiner

METHOD OF MANUFACTURING CURVED SECONDARY BATTERY

CROSS-REFERENCE TO RELATED APPLICATIONS

Korean Patent Application No. 10-2013-0129565, filed on Oct. 29, 2013, and Korean Patent Application No. 10-2014-0084627, filed on Jul. 7, 2014, in the Korean Intellectual Property Office, are incorporated by reference herein in their entirety.

BACKGROUND

1. Field

Embodiments relate to a method of manufacturing a curved secondary battery.

2. Description of the Related Art

Secondary batteries are rechargeable, unlike primary batteries that are not rechargeable. Secondary batteries may be economical and environmentally friendly, and their use is recommended.

SUMMARY

Embodiments are directed to a method of manufacturing a curved secondary battery.

The embodiments may be realized by providing a method of manufacturing a curved secondary battery, the method including preparing a flat secondary battery such that the flat secondary battery includes an electrode assembly and a pouch accommodating the electrode assembly; primary shaping the secondary battery such that the primary shaping includes disposing the flat secondary battery in a first jig, and pressing the flat secondary battery to form a primarily-shaped secondary battery such that the primarily-shaped secondary battery has a first curvature radius; secondary shaping the secondary battery such that the secondary shaping includes disposing the primarily-shaped secondary battery in a second jig, and pressing the primarily-shaped secondary battery to form a secondarily-shaped secondary battery having a second curvature radius; and maintaining the secondarily-shaped secondary battery after forming thereof in the second jig for a predetermined time period.

The first curvature radius may be greater than the second curvature radius.

The first jig may include a first upper jig and a first lower jig such that the first upper jig and the first lower jig are separate from each other, one of the first upper jig or the first lower jig includes a first convex portion having the first curvature radius, another of the first upper jig or the first lower jig may include a first concave portion corresponding to the first convex portion, and the first concave portion may have a curvature radius greater than the first curvature radius.

Primary shaping the secondary battery may include heating the flat secondary battery with heat from the first jig.

The first jig may heat the flat secondary battery to a temperature of about 20° C. to about 80° C.

Each of the first convex portion and the first concave portion may include a buffer member attached thereto.

Pressing the flat secondary battery may include the first jig pressing the flat secondary battery with a first pressure of about 1 kgF/cm$^2$ to about 5 kgF/cm$^2$ for a time period of about 3 seconds to about 30 seconds.

The first jig pressing the flat secondary battery may include increasing the first pressure from a first initial pressure of about 1 kgF/cm$^2$ to about 3 kgF/cm$^2$ to a first end pressure of about 3 kgF/cm$^2$ to about 5 kgF/cm$^2$.

The second jig may be located in an oven, and may include a second upper jig and a second lower jig such that the second upper jig and the second lower jig are separate from each other.

The second jig may be formed of a metal, and the oven may heat the second jig to about 50° C. to about 75° C.

Secondary shaping the secondary battery may include the second jig pressing the primarily-shaped secondary battery with a second pressure of about 3.5 kgF/cm$^2$ to about 8 kgF/cm$^2$ for a time period of about 10 minutes to about 4 hours.

The second jig pressing the primarily-shaped secondary battery may include increasing the second pressure from a second initial pressure of about 3.5 kgF/cm$^2$ to about 6 kgF/cm$^2$ to a second end pressure of about 6 kgF/cm$^2$ to about 8 kgF/cm$^2$, and maintaining the second end pressure for a predetermined time period.

One of the second upper jig or the second lower jig may include a second convex portion having the second curvature radius; another of the second upper jig or the second lower jig may include a second concave portion corresponding to the second convex portion such that the second concave portion has a curvature radius greater than the second curvature radius; and each of the second convex portion and the second concave portion may include a buffer member attached thereto.

The method may further include an initial charging/discharging operation of initially charging/discharging the secondarily-shaped secondary battery.

A shape of the secondarily-shaped secondary battery in a portion corresponding to the second curvature radius may be partially recovered to an original shape in the initial charging/discharging operation.

Maintaining the secondarily-shaped secondary battery in the second jig for a predetermined time period may include cooling the second jig at ambient temperature.

A plurality of flat secondary batteries may be disposed in the first jig.

A plurality of primarily-shaped secondary batteries may be disposed in the second jig.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Although terms such as "first" and "second" may be used herein to describe various elements or components, these elements or components should not be limited by these terms. These terms are only used to distinguish one element or component from another element or component.

The terms used herein are for the purpose of describing exemplary embodiments only and are not intended to be limiting. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Figure 1:
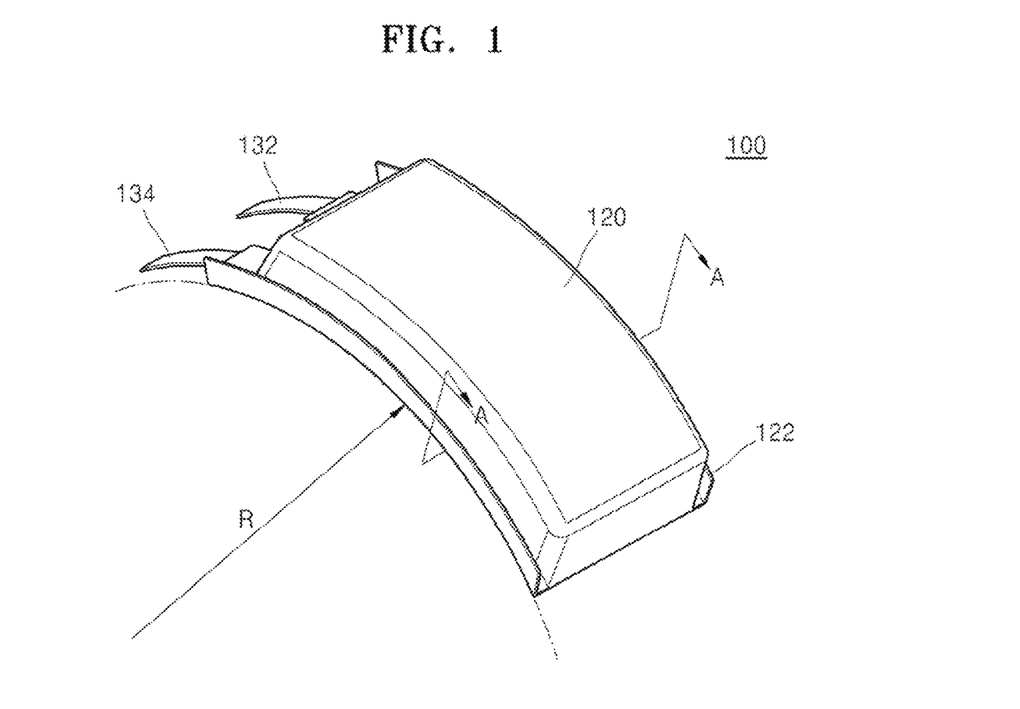
FIG. 1 illustrates a schematic perspective view of a secondary battery according to an embodiment.
Figure 2:
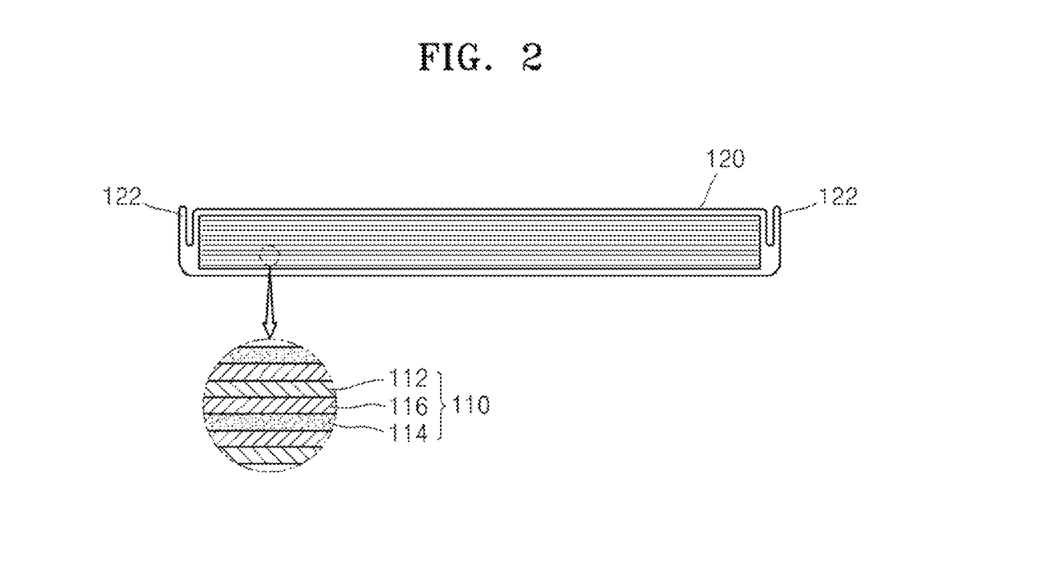
FIG. 2 illustrates a schematic cross-sectional view taken along line A-A of FIG. 1.

FIG. 1 illustrates a schematic perspective view of a curved secondary battery 100 according to an embodiment. FIG. 2 illustrates a schematic cross-sectional view taken along line A-A of FIG. 1.

Referring to FIGS. 1 and 2, the curved secondary battery 100 may include: an electrode assembly 110; and a pouch 120 accommodating or configured to seal in the electrode assembly 110.

For example, the electrode assembly 110 may be fabricated by stacking a plurality of structures including a positive electrode plate 112, a negative electrode plate 114 coated with a negative electrode active material, and a separator 116 interposed between the positive electrode plate 112 and the negative electrode plate 114, in the form of a jelly roll shape, a stack structure including the positive electrode plate 112, the separator 116, and the negative electrode plate 114.

The positive electrode plate 112 may include: a positive electrode active material portion coated with a positive electrode active material; and a positive electrode uncoated portion that is not coated with the positive electrode active material. The positive electrode active material may be a lithium-containing transition metal oxide, such as $LiCoO_2$, $LiNiO_2$, $LiMnO_2$, or $LiMnO_4$, or a lithium chalcogenide compound.

For example, the positive electrode active material portion may be formed by coating a portion of at least one surface of an aluminum plate with a positive electrode active material, and the positive electrode uncoated portion may be the other portion of the aluminum plate that is not coated with the positive electrode active material.

The negative electrode plate 114 may include: a negative electrode active material portion coated with a negative electrode active material; and a negative electrode uncoated portion that is not coated with the negative electrode active material. The negative electrode active material may be a carbon material, such as crystalline carbon, amorphous carbon, carbon complex, or carbon fiber, a lithium metal, or a lithium alloy.

For example, the negative electrode active material portion may be formed by coating a portion of at least one surface of a copper plate with a negative electrode active material, and the negative electrode uncoated portion may be the other portion of the copper plate that is not coated with the negative electrode active material.

For example, the separator may be fabricated by coating polyvinylidenefluoride-hexafluoropropylene (PVDF-HFP) copolymer on a suitable base material (e.g., polyethylene (PE), polystyrene (PS), polypropylene (PP), or polyethylene-polypropylene (PE-PP) copolymer).

A first electrode tab 132 and a second electrode tab 134 may be attached to the electrode assembly 110. For example, the first electrode tab 132 and the second electrode tab 134 may be respectively attached to the positive electrode uncoated portions and the negative electrode uncoated portions, and the first electrode tab 132 and the second electrode tab 134 may be extracted to the outside by passing through the pouch 120.

The pouch 120 may accommodate or may be configured to seal the electrode assembly 110 and may receive an electrolyte together with the electrode assembly 110. For example, the pouch 120 may have a three-layered structure including an insulating layer, a metal layer, and an insulating layer. In an implementation, the metal layer may be formed of aluminum, steel, or stainless steel, and the insulating layer may be formed of cast polypropylene (CPP), polyethylene terephthalate (PET), or nylon.

The pouch 120 may include a pair of wing portions 122 that are formed by melting adhesion. The pouch 120 may include: a receiving portion configured to form a first surface; and a cover portion configured to form a second surface. A receiving space configured to receive or accommodate the electrode assembly 110 may be formed at the receiving portion. When the electrode assembly 110 is received in the receiving space, the cover portion (having one side formed continuously with the receiving portion) may be folded on the receiving portion, and then the receiving portion and the cover portion may be melt-adhered at edges of the receiving space. Accordingly, the electrode assembly 110 may be sealed, and the pair of wing portions 122 may be formed by the edges at which the receiving portion and the cover portion are adhered. The pair of wing portions 122 may be bent in parallel to a side surface of the curved secondary battery 100.

The curved secondary battery 100 may have a curved shape with a predetermined curvature radius R, and may be curved through a shaping or molding process. For example, the curved secondary battery 100 may have a curved surface according to or corresponding to a shape of an electronic device (not illustrated) into which the curved secondary battery 100 may be installed. Accordingly, a gap between the electronic device and the curved secondary battery 100 may be removed or eliminated. Therefore, an internal space of the electronic device may be efficiently used, and damage to the curved secondary battery 100 (e.g., caused by the flow or movement of the curved secondary battery 100 within the electronic device) may be reduced and/or prevented.

As the curvature radius R of the curved secondary battery 100 decreases, a pressure that is applied to the curved secondary battery 100 during the shaping process may increase. When the pressure increases, a region on which a stress is concentrated could be formed in the secondary battery 100 as it is pressed. Also, the curved secondary battery 100 could be deformed or distorted, the active materials could be removed (e.g., from the electrode plates), and/or the electrode plates and the pouch 120 could be wrinkled. According to an embodiment, a minimum pressure for forming a curvature radius may be applied through two shaping operations, stress generated at the curved secondary battery 100 may be minimized, and the curved secondary battery 100 (having a curvature radius R of about 25R or less) may be manufactured.

Hereinafter, a method of manufacturing the curved secondary battery 100 according to an embodiment will be described.

Figure 3:
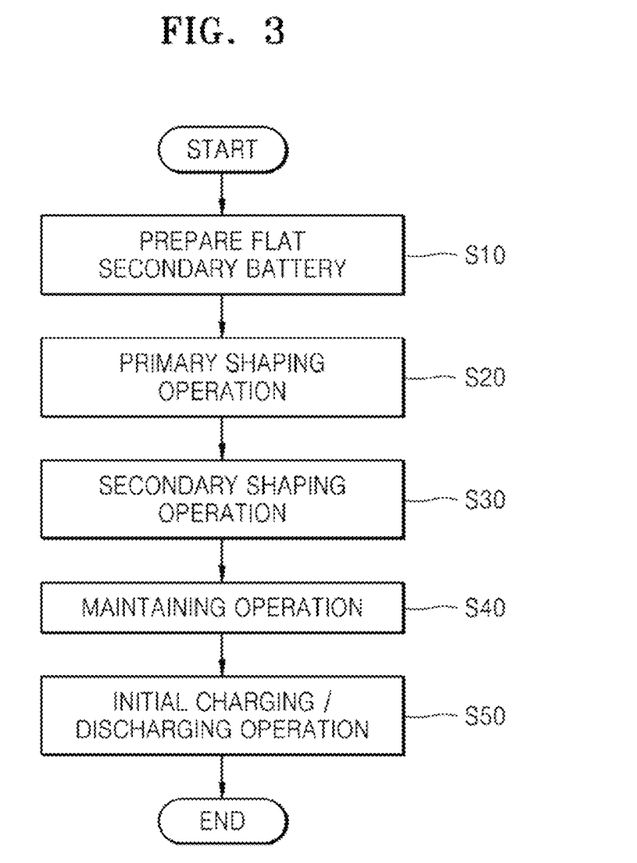
FIG. 3 illustrates a flowchart of a method of manufacturing a secondary battery according to an embodiment.
Figure 4:
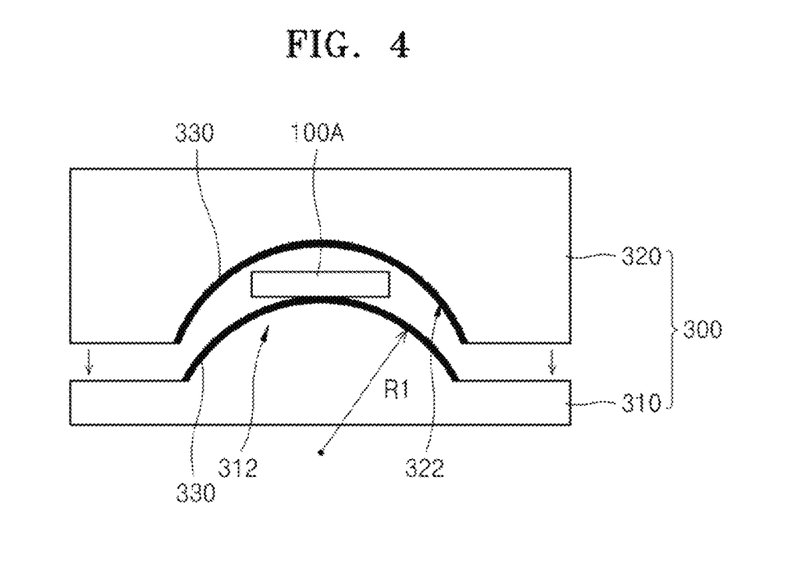
FIG. 4 illustrates a schematic cross-sectional view of a primary molding operation of FIG. 3.
Figure 5:
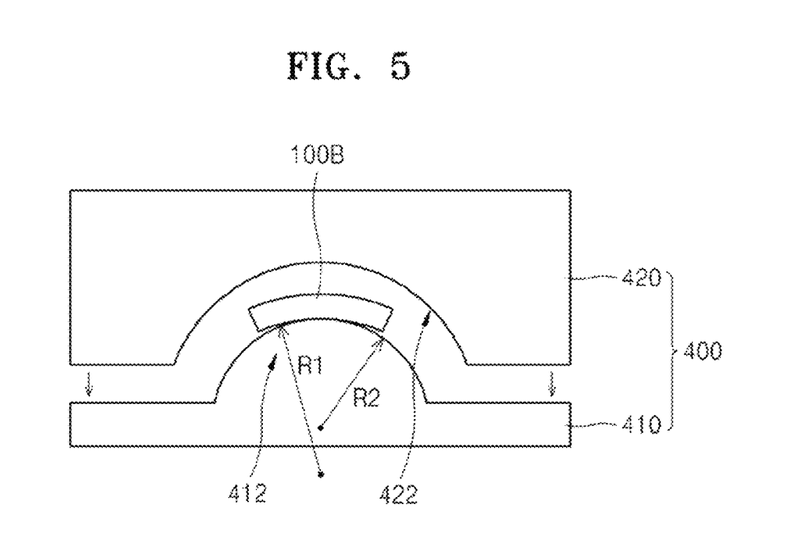
FIG. 5 illustrates a schematic cross-sectional view illustrating a secondary molding operation of FIG. 3.

FIG. 3 illustrates a flowchart of a method of manufacturing the curved secondary battery 100 according to an embodiment. FIG. 4 illustrates a schematic cross-sectional view of a primary molding or shaping operation of FIG. 3. FIG. 5 illustrates a schematic cross-sectional view of a secondary molding or shaping operation of FIG. 3.

Referring to FIGS. 1 to 5, the method of manufacturing the curved secondary battery 100 according to an embodiment may include, e.g., an operation S10 of preparing a flat secondary battery 100A; a primary molding or shaping operation S20 (that includes mounting the flat secondary battery 100A in a first jig 300 and pressing the flat secondary battery 100A to form a primarily-shaped secondary battery); a secondary molding or shaping operation S30 (that includes mounting the primarily-shaped secondary battery 100B, which has been dismounted or un-mounted from the first jig 300, in a second jig 400 and pressing the primarily-shaped secondary battery 100B); a maintaining operation S40; and an initial charging/discharging operation.

The operation S10 of preparing the flat secondary battery 100A may correspond to an operation of manufacturing the flat secondary battery 100A that has the same structure as the curved secondary battery 100 described with reference to FIGS. 1 and 2, but has not undergone the shaping operation yet. The flat secondary battery 100A may be pre-charged to about 20% of its full capacity.

The first or primary shaping operation S20 may include, e.g., mounting the flat secondary battery 100A in the first jig 300, and then pressing the flat secondary battery 100A to form the primarily-shaped secondary battery 100B. In the first shaping operation S20 according to an embodiment, a plurality of flat secondary batteries 100A may be disposed in the first jig 300 so that the plurality of flat secondary batteries 100A may be simultaneously shaped.

The first jig 300 may include, e.g., a first lower jig 310 and a first upper jig 320, and the first lower jig 310 and the first upper jig 320 may be separate or spaced apart from each other. In an implementation first jig 300 may be formed of or may include, e.g., a metal.

One of the first lower jig 310 or the first upper jig 320 may include a first convex portion 312 that has a first curvature radius R1. The first curvature radius R1 may be greater than the curvature radius R of the curved secondary battery 100. Another of the first lower jig 310 or the first upper jig 320 may include a first concave portion 322 corresponding or opposite to the first convex portion 312. The first concave portion 322 may have a curvature radius greater than the first curvature radius R1.

FIG. 4 illustrates an example in which the first convex portion 312 is formed in the first lower jig 310, and the first concave portion 322 is formed in the first upper jig 320. In an implementation, the first convex portion 312 may be formed in the first upper jig 320 and the first concave portion 322 is formed in the first lower jig 310.

When the flat secondary battery 100A is disposed in the first jig 300, the first jig 300 may press the flat secondary battery 100A. In an implementation, a buffer member 330 may be attached to each of the first convex portion 312 and the first concave portion 322. The buffer member 330 may help prevent the first convex portion 312 and/or the first concave portion 322 from being pressed and/or deformed by a portion (e.g., an edge portion) of the flat secondary battery 100A that is being pressed.

In an implementation, a primarily-shaped secondary battery 100B may be formed by pressing the flat secondary battery 100A via the first jig 300 with a first pressure of about 1 kgF/cm$^2$ to about 5 kgF/cm$^2$ for a time period of about 3 seconds to about 30 seconds.

In an implementation, the primarily-shaped secondary battery 100B may be formed by applying a small pressure for a relatively short time period, a displacement amount of the flat secondary battery 100A generated during the shaping may be small. with a non-uniform pressure. Thus, an amount of stress generated in the flat secondary battery 100A may be minimized and few wrinkles may be generated in the external appearance of the primarily-shaped secondary battery 100B.

[Regarding the first pressure, a first initial pressure applied at an initial stage of the primary shaping operation S20 may be set to be different from a first end pressure applied at an end stage of the primary shaping operation S20. Thus, the flat secondary battery 100A may be pressed in the first jig 300 depending on pressure the operation of applying the first initial pressure and the operation of applying the first end pressure. For example, the first jig 300 may press the flat secondary battery 100A while dividing the first pressure in the pressing operation, such as a first initial pressure applied at an initial stage and a first end pressure applied at an end stage, depending on pressure levels. For example, the first jig 300 may press the flat secondary battery 100A by increasing the first pressure from a first initial pressure of about 1 kgF/cm$^2$ to about 3 kgF/cm$^2$ to a first end pressure of about 3 kgF/cm$^2$ to about 5 kgF/cm$^2$. For example, the first jig pressing the flat secondary battery may include increasing the first pressure from a first initial pressure of about 1 kgF/cm$^2$ to about 3 kgF/cm$^2$ to a first end pressure of about 3 kgF/cm$^2$ to about 5 kgF/cm$^2$.

A time period during which the first initial pressure and the first end pressure are applied may be distributed within a time period of about 3 seconds to about 30 seconds, e.g., the time during which the first pressure is applied. For example, the first initial pressure may be applied at an initial stage, the first pressure may then be increased from the first initial pressure to the first end pressure for a predetermined initial time period, and the first end pressure may be maintained during a remaining time period.

During the primary shaping operation S20, the flat secondary battery 100A. may be pressed in the first jig 300 at a normal temperature. Also, the flat secondary battery 100A may be heated in the first jig 300. For example, the flat secondary battery 100A may be heated in the first jig 300 to a temperature of about 20° C. to about 80° C., e.g., about 50° C. to about 80° C.

For example, as a result of the pressing in the first jig 300, the flat secondary battery 100A may have a convex outer surface in a bending direction and a concave inner surface in the bending direction. Also, only the convex outer surface may be heated in the first jig 300 during the primary shaping operation S20.

In the primary shaping operation S20, the convex outer surface of the secondary battery 100A may contact the first concave portion 322 and may receive an expansion stress, and the concave inner surface may receive a contraction stress. For example, the expansion stress may be reduced by heating the convex outer surface (e.g., heating only the convex outer surface without heating the concave inner surface), and the contraction stress may be applied to the concave inner surface. Thus, generation of a wrinkle or imperfection (on which a stress may be concentrated) may be more effectively reduced and/or prevented at the pouch 120.

After the pressing operation, the primarily-shaped secondary battery 100B (having a first curvature radius R1) may be dismounted or un-mounted from the first jig 300.

The secondary shaping operation S30 may include, e.g., disposing the primarily-shaped secondary battery 100B in the second jig 400 and pressing the primarily-shaped secondary battery 100B. In the secondary shaping operation S30, according to another embodiment, a plurality of primarily-shaped secondary batteries 100B may be disposed in the second jig 400, so that the plurality of primarily-shaped secondary batteries 100B may be simultaneously shaped.

The second jig 400 may include, e.g., a second lower jig 410 and a second upper jig 420, that are separate or spaced apart from each other. The second jig 400 may be formed of or may include, e.g., a metal. In an implementation, the second jig 400 may be located or disposed in an oven.

One of the second lower jig 410 or the second upper jig 420 may include a second convex portion 412 that has a second curvature radius R2 that is smaller than the curvature radius R of the curved secondary battery 100. As described below, the second curvature radius R2 may be set in consideration of the degree to which a shape of the secondarily-shaped secondary battery 100B in a portion corresponding to the curvature radius R is recovered to an original shape in the initial charging/discharging operation S50.

Another of the second lower jig 410 or the second upper jig 420 may include a second concave portion 422 (corresponding to the second convex portion 412). The second concave portion 422 may have a curvature radius that is greater than the second curvature radius R2 of the second convex portion 412.

The primarily-shaped secondary battery 100B (having the first curvature radius R1) may be mounted in the second jig 400, and the second jig 400 may press the primarily-shaped secondary battery 100B. In an implementation, a buffer member (not illustrated) may be attached to each of the second convex portion 412 and the second concave portion 422.

The second jig 400 may press the primarily-shaped secondary battery 100B with a second pressure of, e.g., about 3.5 kgF/cm$^2$ to about 8 kgF/cm$^2$, for a time period of about 10 minutes to about 4 hours, e.g., about 1 hour to about 4 hours.

Regarding the second pressure, a second initial pressure applied at an initial stage of the secondary shaping operation S20 may be set to be different from a second end pressure applied at an end stage of the secondary shaping operation S30. Thus, the primarily-shaped secondary battery 100B may be pressed in the second jig 400 depending on the operation of applying the second initial pressure and the operation of applying the second end pressure. For example, the second jig 400 may press the primarily-shaped secondary battery 100B while increasing the second pressure from a second initial pressure of about 3.5 kgF/cm$^2$ to about 6 kgF/cm$^2$ to a second end pressure of about 6 kgF/cm$^2$ to about 8 kgF/cm$^2$. For example, the second jig 400 pressing the flat secondary battery may include increasing the second pressure from a second initial pressure of about 3.5 kgF/cm$^2$ to about 6 kgF/cm$^2$ to a second end pressure of about 6 kgF/cm$^2$ to about 8 kgF/cm$^2$.

A time period in which the second initial pressure and the second end pressure are applied may be distributed within a total time period during which the second pressure is applied. For example, the second initial pressure may be applied at the initial stage, the second pressure may then be sequentially or continuously increased to the second end pressure during the first about 10-minute to about 30-minute time period, and the second end pressure may be maintained during a remaining time period.

During the secondary shaping operation S30, the second jig 400 may heat the primarily-shaped secondary battery 100B, e.g., an entirety of the primarily-shaped secondary battery 100B. In an implementation, the second jig 400 may be located in an oven, and may be formed of or may include a material having high thermal conductivity, e.g., a metal. For example, the oven may heat the second jig 400, and the second jig 400 may heat the primarily-shaped secondary battery 100B. For example, the temperature of the oven may be about 50° C. to about 75° C.

After the secondary shaping operation S30, the secondarily-shaped secondary battery may have a second curvature radius R2 that is smaller than the curvature radius R of the curved secondary battery 100.

For example, in the secondary shaping operation S30, the secondarily-shaped secondary battery (having the first curvature radius R1) may be shaped to have the second curvature radius R2, and a deformation degree thereof may be small, as compared to a case in which a secondary battery is directly deformed from the flat state to have the second curvature radius R2. Accordingly, stress generated at the curved secondary battery 100 may be relatively small. Therefore, damage to the curved secondary battery 100 may be reduced, and the curved secondary battery 100 having a small curvature radius may be manufactured.

The maintaining operation S40 may include stabilizing the secondarily-shaped secondary battery by cooling the second jig 400 at or to normal temperature or ambient or room temperature (e.g., ~20-25° C.) while maintaining the secondarily-shaped secondary battery in the second jig 400.

The initial charging/discharging operation S50 may be an operation of dismounting the secondarily-shaped secondary battery from the second jig and performing an initial charging/discharging of the secondarily-shaped secondary battery. In the initial charging/discharging, the curvature of the secondarily-shaped secondary battery may be partially reduced due to the contraction/expansion of the positive electrode plate 112 and the negative electrode plate 114, and the secondarily-shaped secondary battery may finally have a curvature radius R. Thus, the second curvature radius R2 may be set in consideration of the degree to which a shape of the secondarily-shaped secondary battery in a portion corresponding to the curvature of the secondarily-shaped secondary battery is recovered to the original shape in the initial charging/discharging operation S50.

Hereinafter, an example will be described.

1. Prepare Flat Secondary Battery

A positive electrode active material composition slurry was manufactured by scattering a 90 weight % of mixed powder including a 85 weight % of LiCoO$_2$ powder (manufactured by Umicore) with an average particle diameter of about 5 μm and a 5 weight % of activated carbon powder (manufactured by Kuraray) with an average particle diameter of about 7.5 μm, a 4 weight % of carbon black (as a conductive material), and a 6 weight % of PVDF (as a binder), in an N-methylpyrrolidone solvent. The positive electrode active material composition slurry was deposited to a thickness of about 145 μm on an aluminum electrode plate by using a doctor blade (gap: about 170 mm), and it was heat-treated and dried at about 100° C. in a vacuum state for about 5.5 hours. Thereafter, a positive electrode plate 112 including a positive electrode active material layer was manufactured by press-rolling the aluminum electrode plate coated with the positive electrode active material composition slurry.

A negative electrode active material composition slurry was manufactured by scattering and mixing a 92 weight % of mixed powder including a 92 weight % of soft carbon (manufactured by GS Caltex), a 5 weight % of carbon black (as a conductive material), a 1 weight % of carboxymethylcellulose (as a thickening agent), and a 2 weight % of styrene-butadiene rubber (as a binder), in an N-methylpyrrolidone solvent, in an aqueous solvent. The negative electrode active material composition slurry was deposited to a thickness of about 140 μm on a copper electrode plate by using a doctor blade (gap: about 160 mm), and it was heat-treated and dried at about 145° C. in a vacuum oven for about 6.5 hours. Thereafter, a negative electrode plate 114 including a negative electrode active material layer was manufactured by press-rolling the copper electrode plate coated with the negative electrode active material composition slurry.

An electrode assembly 110 was manufactured by inserting a PE separator 116 between the positive electrode plate and the negative electrode plate. Thereafter, a flat secondary battery 100A was manufactured by sealing the electrode assembly 110 in a pouch 120 and injecting an electrolyte (a 1.13 M $LiPF_6$ solution in ethylene carbonate (EC)+dimethylene carbonate (DMC)+diethylene carbonate (DEC) (3:5:2 volume ratio)) into the pouch 120.

2. Primary Shaping Operation

The flat secondary battery 100A was mounted in the first jig 300 and was then pressed for about 20 seconds. Specifically, the pressure generated by the first jig 300 was increased from about 2 $kgF/cm^2$ to about 3 $kgF/cm^2$ during the first 10-second time period, and the pressure of the first jig was maintained at about 3 $kgF/cm^2$ during the remaining 10-second time period. After the primary shaping operation, the primarily-shaped secondary battery 100B had a curvature radius of about 40R.

Figure 6:
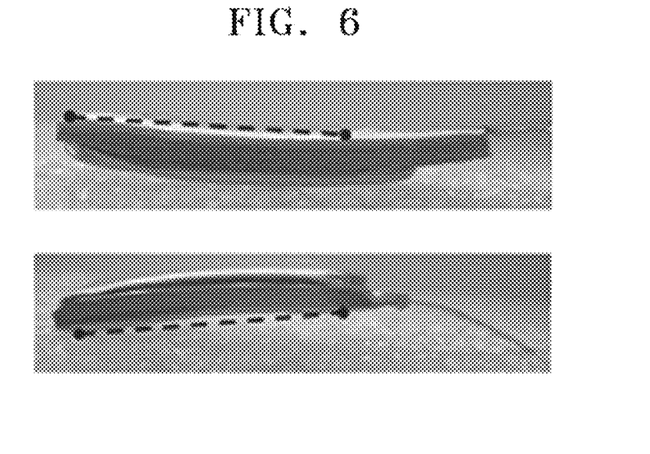
FIG. 6 illustrates a diagram showing a primarily shaped secondary battery after the primary shaping operation of FIG. 4.

FIG. 6 illustrates a diagram of a primarily-shaped secondary battery 100B after the primary shaping operation of FIG. 4. Referring to FIG. 6, it may be seen that almost no wrinkle was generated in the pouch 120 of the primarily-shaped secondary battery 100B after the primary shaping operation.

3. Secondary Shaping Operation, Maintaining Operation, and Initial Charging/Discharging Operation The primarily-shaped secondary battery was mounted in the second jig (located in the oven set to about 70° C.) and was then pressed for about 2 hours. Specifically, the pressure of the second jig was continuously increased from about 3.5 $kgF/cm^2$ to about 8 $kgF/cm^2$ during the first 20-minute time period, and the pressure of the second jig was maintained at about 8 $kgF/cm^2$ during the remaining time period.

Figure 7:
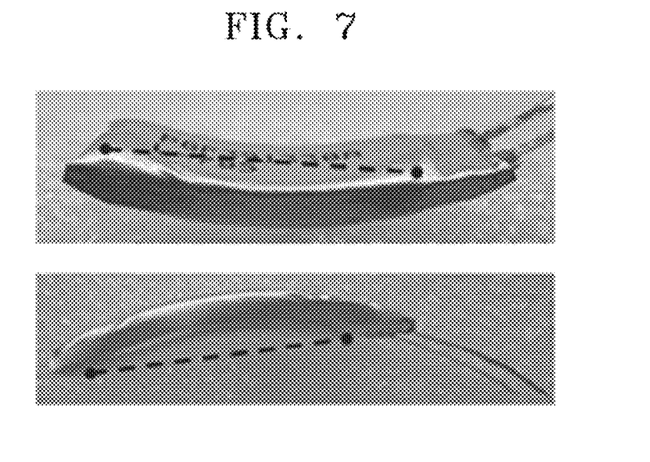
FIG. 7 illustrates a diagram showing a secondarily shaped secondary battery after the secondary shaping operation of FIG. 5.

FIG. 7 illustrates a diagram of a secondarily-shaped secondary battery after the secondary shaping operation of FIG. 5. After the secondary shaping operation, the secondarily-shaped secondary battery was formed to have a curvature radius of about 22R.

Thereafter, the secondarily-shaped secondary battery was mounted in the second jig 400, and the second jig 400 was cooled at or to ambient temperature. Thereafter, the secondarily-shaped secondary battery was dismounted from the second jig 400, and initial charging/discharging of the secondarily-shaped secondary battery was performed. In the initial charging/discharging, a portion of the curvature of the secondarily-shaped secondary battery was reduced, so that the curved secondary battery 100 was finally formed to have a curvature radius of about 25R.

In this manner, a curved secondary battery 100 may be formed by applying a relatively small pressure through two shaping operations, and a stress generated in the curved secondary battery 100 may be small. Therefore, damage to the curved secondary battery may be reduced, and the curved secondary battery 100 having a small curvature radius may be manufactured.

By way of summation and review, types of electronic devices using secondary batteries have been diversified, and designs of electronic devices may be an important factor to a consumer when contemplating the purchase of electronic devices.

For example, wearable computers using secondary batteries as a power supply source, and applications thereof, have been considered. Also, electronic devices, such as mobile phones and laptop computers, may have curved surfaces for ergonomic purposes. Thus, secondary batteries for operating such electronic devices may have curved surfaces according to the shapes of the electronic devices.

As described above, according to the one or more of the above embodiments damage to the curved secondary batteries may be reduced, and the curved secondary batteries having a small curvature radius may be manufactured.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of manufacturing a curved secondary battery, the method comprising:
preparing a flat secondary battery such that the flat secondary battery includes an electrode assembly and a pouch accommodating the electrode assembly;
primary shaping the secondary battery such that the primary shaping includes:
disposing the flat secondary battery in a first jig, and
pressing the flat secondary battery to form a primarily-shaped secondary battery such that the primarily-shaped secondary battery has a first curvature radius;
secondary shaping the secondary battery such that the secondary shaping includes:
disposing the primarily-shaped secondary battery in a second jig different from the first jig, and
pressing the primarily-shaped secondary battery to form a secondarily-shaped secondary battery having a second curvature radius smaller than the first curvature radius; and
maintaining the secondarily-shaped secondary battery after forming thereof in the second jig for a predetermined time period,
wherein the first jig includes a first upper jig and a first lower jig such that the first upper jig and the first lower jig are separate from each other, wherein the second jig includes a second upper jig and a second lower jig such that the second upper jig and the second lower jig are separate from each other, wherein pressing the flat secondary battery includes the first jig pressing the flat secondary battery with a first pressure of about 1 kgF/cm² to about 5 kgF/cm² for a time period of about 3 seconds to about 30 seconds, and wherein secondary shaping the secondary battery includes the second jig pressing the primarily-shaped secondary battery with a second pressure of about 3.5 kgF/cm² to about 8 kgF/cm² for a time period of about 10 minutes to about 4 hours.

2. The method as claimed in claim 1, wherein:
one of the first upper jig or the first lower jig includes a first convex portion having the first curvature radius,
another of the first upper jig or the first lower jig includes a first concave portion corresponding to the first convex portion, and
the first concave portion has a curvature radius greater than the first curvature radius.

3. The method as claimed in claim 1, wherein primary shaping the secondary battery includes heating the flat secondary battery with heat from the first jig.

4. The method as claimed in claim 3, wherein the first jig heats the flat secondary battery to a temperature of about 20° C. to about 80° C.

5. The method as claimed in claim 2, wherein each of the first convex portion and the first concave portion include a buffer member attached thereto.

6. The method as claimed in claim 1, wherein the first jig pressing the flat secondary battery includes increasing the first pressure from a first initial pressure of about 1 kgF/cm² to about 3 kgF/cm² to a first end pressure of about 3 kgF/cm² to about 5 kgF/cm².

7. The method as claimed in claim 1, wherein the second jig:
is located in an oven.

8. The method as claimed in claim 7, wherein:
the second jig is formed of a metal, and
the oven heats the second jig to about 50° C. to about 75° C.

9. The method as claimed in claim 1, wherein the second jig pressing the primarily-shaped secondary battery includes:
increasing the second pressure from a second initial pressure of about 3.5 kgF/cm² to about 6 kgF/cm² to a second end pressure of about 6 kgF/cm² to about 8 kgF/cm², and
maintaining the second end pressure for a predetermined time period.

10. The method as claimed in claim 7, wherein:
one of the second upper jig or the second lower jig includes a second convex portion having the second curvature radius;
another of the second upper jig or the second lower jig includes a second concave portion corresponding to the second convex portion such that the second concave portion has a curvature radius greater than the second curvature radius; and
each of the second convex portion and the second concave portion includes a buffer member attached thereto.

11. The method as claimed in claim 1, further comprising an initial charging/discharging operation of initially charging/discharging the secondarily-shaped secondary battery.

12. The method as claimed in claim 11, wherein a shape of the secondarily-shaped secondary battery in a portion corresponding to the second curvature radius is partially recovered to an original shape in the initial charging/discharging operation.

13. The method as claimed in claim 1, wherein maintaining the secondarily-shaped secondary battery in the second jig for a predetermined time period includes cooling the second jig at ambient temperature.

14. The method as claimed in claim 1, wherein a plurality of flat secondary batteries are disposed in the first jig.

15. The method as claimed in claim 1, wherein a plurality of primarily-shaped secondary batteries are disposed in the second jig.

* * * * *